United States Patent [19]
Lyons et al.

[11] Patent Number: 6,058,031
[45] Date of Patent: *May 2, 2000

[54] FIVE LEVEL HIGH POWER MOTOR DRIVE CONVERTER AND CONTROL SYSTEM

[75] Inventors: James Patrick Lyons, Niskayuna; Vlatko Vlatkovic, Schenectady, both of N.Y.; Paul Martin Espelage, Salem, Va.; Albert Andreas Maria Esser, Delafield, Wis.; Yifan Zhao, Niskayuna, N.Y.; Fei Fred Wang, Sr., Blacksburg, Va.

[73] Assignee: General Electric Company, Schenectady, N.Y.

[*] Notice: This patent is subject to a terminal disclaimer.

[21] Appl. No.: 09/108,044

[22] Filed: Jun. 30, 1998

Related U.S. Application Data

[60] Provisional application No. 60/064,404, Oct. 30, 1997, and provisional application No. 60/063,223, Oct. 23, 1997.

[51] Int. Cl.[7] .................................................. H02M 7/217
[52] U.S. Cl. ........................ 363/67; 363/132; 363/98
[58] Field of Search .......................... 363/65, 67, 98

[56] References Cited

U.S. PATENT DOCUMENTS

| | | | |
|---|---|---|---|
| 4,117,364 | 9/1978 | Baker | 318/230 |
| 4,137,570 | 1/1979 | Baker | 363/43 |
| 4,167,775 | 9/1979 | Baker et al. | 363/42 |
| 4,210,826 | 7/1980 | Baker | 307/254 |
| 4,270,163 | 5/1981 | Baker | 363/43 |
| 4,855,893 | 8/1989 | Kratz | 363/136 |
| 4,881,159 | 11/1989 | Holtz et al. | 363/58 |
| 4,961,129 | 10/1990 | Shekhawat | 363/40 |
| 5,060,129 | 10/1991 | Maruyama | 363/41 |
| 5,155,675 | 10/1992 | Maruyama et al. | 363/98 |
| 5,274,542 | 12/1993 | Tanaka et al. | 363/96 |
| 5,355,297 | 10/1994 | Kawabata et al. . | |
| 5,361,196 | 11/1994 | Tanamachi et al. | 363/41 |
| 5,365,424 | 11/1994 | Deam et al. | 363/144 |
| 5,459,655 | 10/1995 | Mori et al. | 363/132 |
| 5,852,558 | 12/1998 | Julian et al. | 363/132 |
| 5,910,892 | 6/1999 | Lyons et al. | 363/43 |

OTHER PUBLICATIONS

Akira Nabae, Isao Takahashi, and Hirofumi Akagi, "A New Neutral–Point–Clamped PWM Inverter", IEEE Transactions on Industry Applications, vol. IA–17, No. 5, Sep./Oct. 1981, pp. 518–523.

Pradeep M. Bhagwat and V. R. Stefanovic, "Generalized Structure of a Multilevel PWM Inverter", IEEE Transactions on Industry Applications, vol. IA–19, No. 6, Nov./Dec. 1983, pp. 1057–1069.

H. Van Der Broeck, H. Skudelny, and G. Stanke, "Analysis and Realization of a Pulsewidth Modulator Based on Voltage Space Vectors", IEEE IAS Transactions, vol. 24, No. 1, Jan./Feb. 1988, pp. 142–150.

Jurgen K. Steinke, "Control Strategy for a Three Phase AC Traction Drive with Three–Level GTO PWM Inverter", IEEE PESC, Apr. 1988, pp. 431–438.

Nam S. Choi, Jung G. Cho, and Gyu H. Cho, "A General Circuit Topology of Multilevel Inverter", IEEE PESC, Jun. 1991, pp. 96–103.

(List continued on next page.)

*Primary Examiner*—Peter S. Wong
*Assistant Examiner*—Gary L. Laxton
*Attorney, Agent, or Firm*—Ann M. Agosti; Jill M. Breedlove

[57] ABSTRACT

A high power motor drive converter includes: a five level hybrid NPC output power conversion stage including three NPC phase bridges having switches and coupled in a wye configuration through a converter neutral point, each NPC phase bridge receiving power on a respective direct current bus; three isolated split series-connected DC capacitor banks each coupled in parallel to a respective one of the three NPC phase bridges; and a controller for selecting switch positions with active control of neutral voltages. The controller is adapted to select switch positions using feedforward sine-triangle modulation with third harmonic injection, zero sequence injection, and/or discontinuous modulation injection.

25 Claims, 16 Drawing Sheets

OTHER PUBLICATIONS

H.L. Klaver, "Control of the Neutral Point of a Three–Level Inverter", EPE Proceedings, Sep. 1991, pp. 278–281.

M. Carpita and S. Tenconi, "A Novel Multilevel Structure for Voltage Source Inverter", EPE 91, Sep. 1991, pp. 90–94.

A. Campagna et al., "A New Generalized Multilevel Three–Phase Structure Controlled by PWM",EPE '91, Sep. 1991, pp. 235–240.

Satoshi Ogasawara and Hirofumi Akagi, "A Vector Control System Using a Neutral–Point–Clamped Voltage Source PWM Inverter", IEEE IAS Conference, Oct. 1991, pp. 422–427.

Jurgen K. Steinke, "Switching Frequency Optimal PWM Control of a Three Level Inverter", IEEE Transactions on Power Electronics, vol. 7, No. 3, Jul. 1992, pp. 487–496.

Hyo L. Liu, Nam S. Choi, and Gyu H. Cho, "DSP Based Space Vector PWM for Three–Level Inverter with DC–Link Voltage Balancing", IECON, Nov. 1991, pp. 197–203.

J. W. Kolar, H. Ertl, and F. C. Zach, "Influence of the Modulation Method on the Conduction and Switching Losses of a PWM Converter System", IEEE Transactions on Industry Applications, Nov./Dec. 1991, pp. 1063–1075.

Mario Marchesoni, "High–Performance Current Control Techniques for Applications to Multilevel High–Power Voltage Source Inverters", IEEE Transactions on Power Electronics, vol. 7, No. 1, Jan. 1992, pp. 189–204.

Nam S. Choi, Yong C. Jung, Hyo L. Liu, and Gyu H. Cho, "A High Voltage Large Capacity Dynamic VAR Compensator Using Multilevel Voltage Source Inverter", IEEE PESC, Jun. 1992, pp. 538–545.

Masato Koyama, Toshiyuki Fujii, Ryohei Uchida, Takao Kawabata, "Space Vector–Based New PWM Method For Large Capacity Three–Level GTO Inverter", IECON, Nov. 1992, pp. 271–276.

G. Carrara, S. Gardella, M. Marchesoni, R. Salutari, and G. Sciutto, "A New Multilevel PWM Method: A Theoretical Analysis", IEEE Transactions on Power Electronics, vol. 7, No. 3, Jul. 1992, pp. 497–505.

Theodor Salzmann and Gerhard Kratz, "High Power Drive System with Advanced power Circuitry and Improved Digital Control", IEEE Trans. on Industry Applications, vol. 29, No. 1, Jan./Feb. 1993, pp. 168–174.

M. Marchesoni and M. Mazzucchelli, Multilevel Converters For High Power AC Drives: a Review, ISIE '93, Jun. 1993, pp. 38–43.

O. Apeldoorn and L. Schulting, "10KVA Four Level Inverter with Symmetrical Input Voltage Distribution", EPE Sep. 1993, pp. 196–201.

Nam S. Choi, Jung G. Cho, and Gyu H. Cho, "Modeling and Analysis of a Multilevel Voltage Source Inverter Applied as a Static VAR Compensator", Int. J. Electronics, 1993, vol. 75, No. 5, pp. 1015–1034.

L. Schulting, M. Posluszny, and T. Platek, "Four–Level DC to DC Converter for High–Voltage Applications", ETEP vol. 4, No. 3, May/Jun. 1994, pp. 231–236.

R. W. Menzies, P. Steimetr, and J. K. Steinke, "Five–Level GTO Inverters for Large Induction Motor Drives", IEEE Transactions on Industry Applications, vol. 30, No. 4, Jul./Aug. 1994, pp. 938–944.

Hyo L. Liu and Gyu H. Cho, "Three–Level Space Vector PWM in Low Index Modulation Region Avoiding Narrow Pulse Problem", IEEE Transactions on Power Electronics, vol. 9, No. 5, Sep. 1994, pp. 481–486.

K. Oguchi, Y. Maki, and Y. Sunaga, "Three–Phase Multilevel–Voltage Source Converters with Low Switching Frequencies and Less Distorted Input Voltages", IEEE Transactions on Industry Applications, vol. 30, No. 5, Sep./Oct. 1994, pp. 1156–1165.

C. Hochgraf, R. Lasseter, D. Divan, and T.A. Lipo, "Comparison of Multilevel Inverters For Static VAR Compensation", IEEE IAS Conference Proceedings, Oct. 1994, pp. 921–928.

Y. Lee, B. Suh, and D. Hyun, "A Novel PWM Scheme for a Three–level Voltage Source Inverter with GTO Thyristors", IEEE Trans. On Industry Applications, vol. 32, No. 2, Mar./Apr. 1996, pp. 260–268.

FIVE LEVEL HIGH POWER MOTOR DRIVE CONVERTER AND CONTROL SYSTEM

This application claims the benefit of U.S. Provisional Application No. 60/064,404, filed Oct. 30, 1997 and the benefit of U.S. Provisional Application No. 60/063,223, filed Oct. 23, 1997.

BACKGROUND OF THE INVENTION

The present invention relates generally to three phase power converters used in high power motor drive systems. The invention relates more specifically to a fast response five level power inverter circuit capable of medium voltage operation without series connection of power electronic switching devices and to an associated modulation control for determining gate timings for the power electronic switching devices.

Baker et al., U.S. Pat. No. 4,270,163, and others have proposed generalized inverter power circuits having four or more levels. This proposed multi-level converter configuration, when used in a five level embodiment, has multiple practical issues impeding construction of a converter system including: twice the direct current (DC) bus voltage of this invention, difficulties obtaining practical high speed clamp diodes (clamp diodes require higher blocking voltages than the switching devices), complicated capacitor balancing requirements, and long convoluted inductive circuit commutation paths.

SUMMARY OF THE INVENTION

It would be desirable to provide a power inverter circuit which has reduced bus voltage requirements and a simpler circuit topology and which acts as a low total harmonic distortion (THD) IEEE-519 compliant power grid interface.

More specifically, it would also to be desirable to provide a quick response high power motor drive converter system in the 1 + MW range capable of supplying an AC drive motor with medium voltage output 3.3–4.16 KV at fundamental output frequencies up into the 100–200 Hz range.

In an embodiment of the present invention, a quick response high power motor drive converter system includes: a five level hybrid NPC output power conversion stage connected to an AC drive motor, three isolated split series-connected DC capacitor banks, a controller for computing switch timings with active control of neutral voltages, a rectifier transformer with three isolated sets of twenty degree phase shifted five level secondaries, and three diode rectifier source converter bridges.

The hybrid NPC output power converter stage and three isolated DC busses create a five level power converter which minimizes voltage steps applied to the drive motor and thereby reduces winding stresses. The five level converter also enables creation of the medium voltage output levels using commercially available switching devices (e.g. insulated gate bipolar transistors).

The modulator control of the five level inverter is used to determine the gate timings for the power electronic switches in the three phase power converter. The converter, in general, produces sinusoidal voltage and currents by a pulse width modulation process in order to achieve smooth control over load voltage. The converter modulation control should be capable of operating as the actuation stage in a vector controlled induction or synchronous motor control and thus be able to create an arbitrary output voltage vector at each control sampling instant in response to transient torque events. The modulation control is preferably software based to minimize any specialized hardware requirements. The modulator control provides compensation for the significant ripple voltages on the independent power converter busses.

This embodiment will support a variety of options including the addition of actively controlling dynamic braking resistors, capacitor bleed/balance resistors, snubber circuits on the inner switch elements and/or on the outer switch elements. Another modification includes of the addition of a neutral-ground reference network tuned to provide damping for reflected wavefronts propagating on the motor cables.

BRIEF DESCRIPTION OF THE DRAWINGS

The features of the invention believed to be novel are set forth with particularity in the appended claims. The invention itself, however, both as to organization and method of operation, together with further objects and advantages thereof, may best be understood by reference to the following description taken in conjunction with the accompanying drawings, where like numerals represent like components, in which:

DETAILED DESCRIPTION OF A PREFERRED EMBODIMENT OF THE INVENTION

Figure 1:
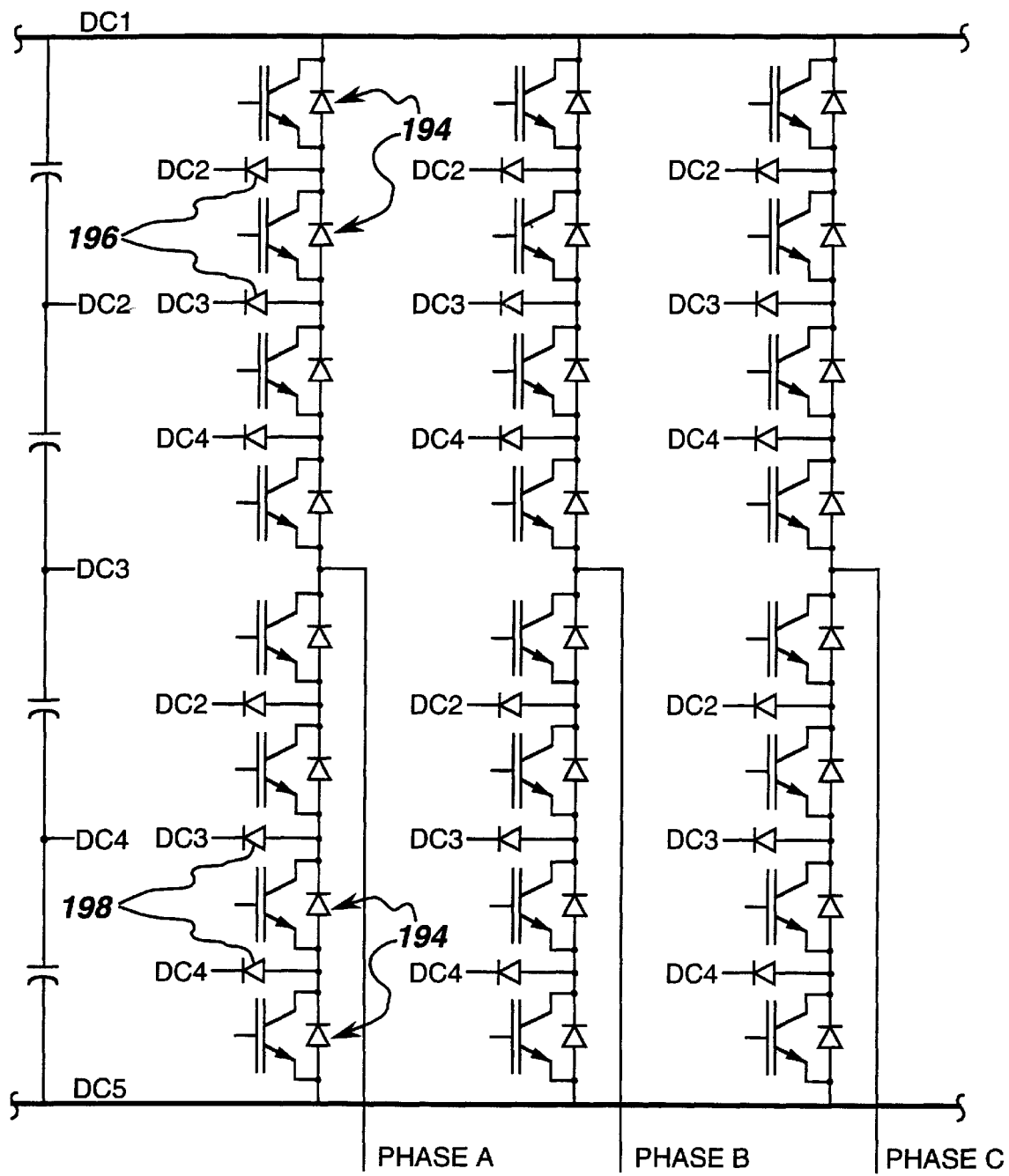
FIG. 1 is a circuit diagram of a multi-level embodiment.

Aforementioned Baker et al., U.S. Pat. No. 4,270,163, proposed generalized inverter power circuits having four or more levels. FIG. 1 is an application of the Baker et al. proposal to a five level inverter. Baker states that a polyphase output voltage of greater than three phases can be provided by adding additional upper and lower legs with switches (shown in FIG. 1 as switch diode pairs 194) and clamp diodes (shown in FIG. 1 as diodes 196 and 198).

Baker states that each new upper and lower leg so added to the three phase embodiment provides an additional phase, and that adding the diodes and switches can also permit higher levels of DC voltage to be converted into higher amplitude AC output waveforms.

Figure 2:
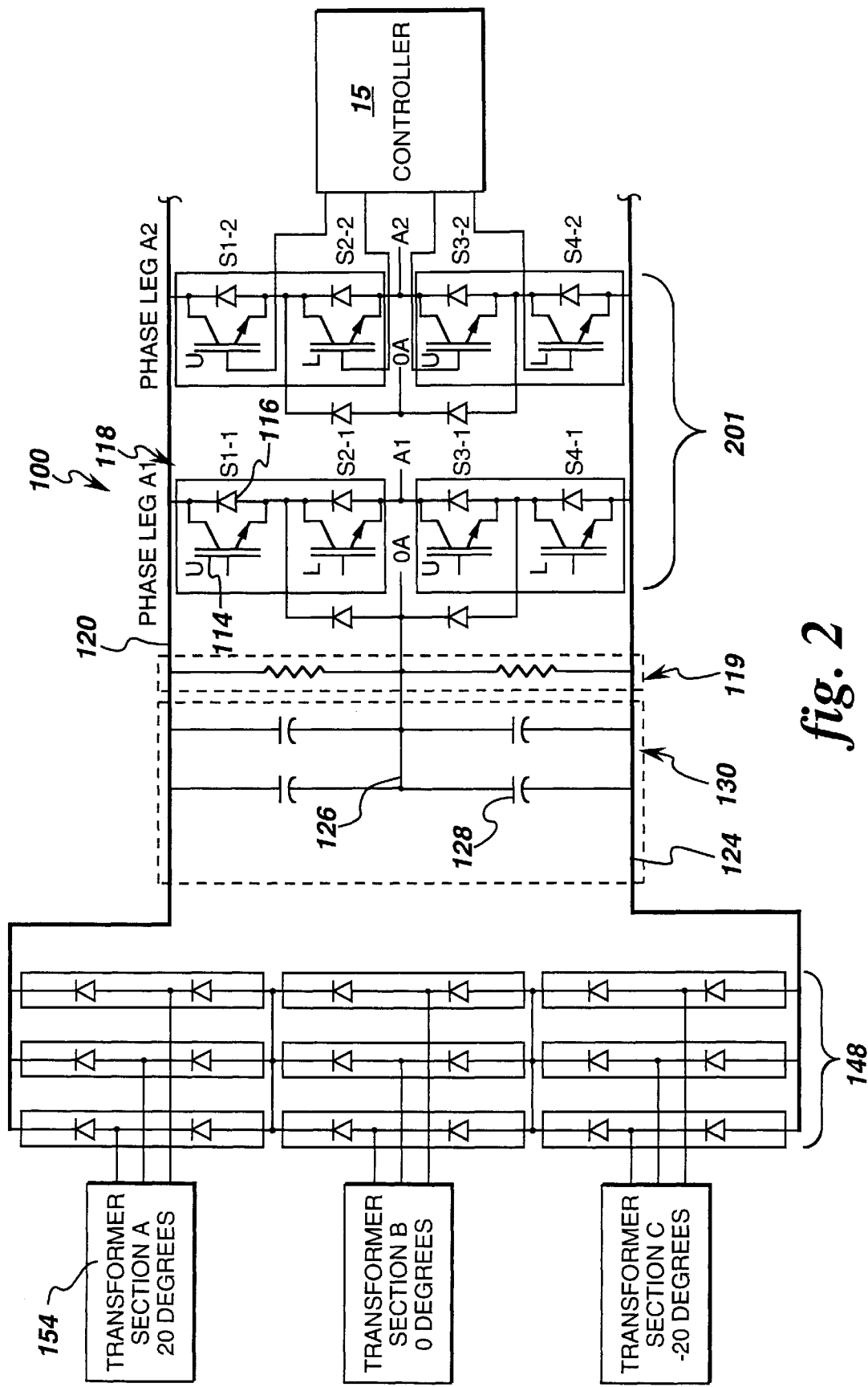
FIG. 2 is a circuit diagram of a single phase bridge of a five level inverter.

FIG. 2 is a circuit diagram of a single phase bridge 100 of a five level inverter 110 (shown in FIG. 7) which combines two NPC (neutral point clamped) three level phase legs 118 with a common DC bus (with a positive rail 120, a negative rail 124, and a midpoint 126) to provide an NPC H-bridge. The NPC three level phase legs include electrical switches 114 which are shown as IGBTs (Insulated Gate Bipolar Transistors). Other useful switches include GTOs (Gate Turn Off Thyristors) and IGCTs (Integrated Gate Commutated Thyristors). The switches are paired with anti-parallel freewheeling diodes 116 to accommodate the inductive motor load currents. A controller 15 is used for controlling each of the switches, The controller may comprise, for example, a computer, a microcomputer, a microprocessor, or, in a preferred embodiment, a digital signal processor.

Figure 3:
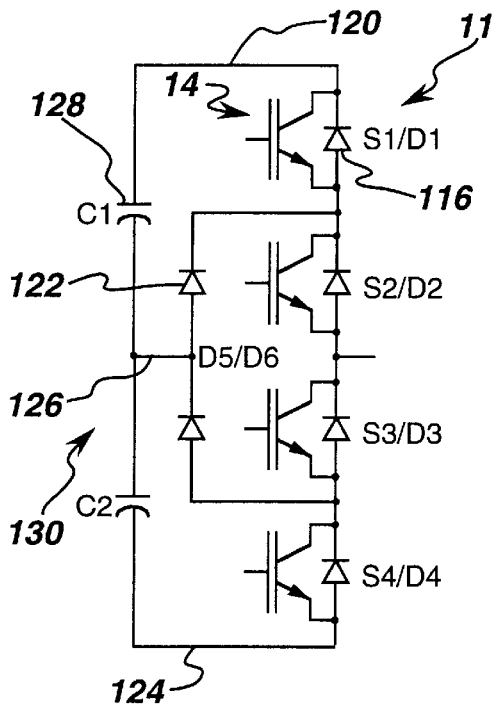
FIG. 3 is a circuit diagram of a NPC three level phase leg.

FIG. 3 is a circuit diagram of an individual NPC three level phase leg 118 of FIG. 2. The three phase inverter has four switch and diode pairs spanning the DC bus and two clamping diodes 122 (labeled D5, D6). The switch diode pairs are labeled top to bottom S1/D1, S2/D2, S3/D3, S4/D4. As shown in Table 1, there are three command states for the switches per phase leg.

TABLE 1

NPC States

| | | | | |
|---|---|---|---|---|
| STATE 1 (+) | S1 ON | S2 ON | S3 OFF | S4 OFF | LOAD PT @ P-BUS |
| STATE 2 (0) | S1 OFF | S2 ON | S3 ON | S4 OFF | LOAD PT @ MID-POINT |
| STATE 3 (−) | S1 OFF | S2 OFF | S3 ON | S4 ON | LOAD PT @ N-BUS |

Depending on the switch commanded state per phase, and the instantaneous polarity of the load current in that phase, the load current path can be through switches, freewheeling diodes, or clamping diodes. For example, if the commanded state is STATE 2, and the load current is positive, the load current path is through clamp diode D5 and switch S2. If the commanded state is STATE 2, and the load current is negative, the load current path is through switch S3, and clamp diode D6.

Table 1 shows the load terminal per phase can be either at P-bus, N-bus, or DC bus midpoint, which gives rise to the terminology three level or neutral point clamped inverter. In a two level inverter, the load terminal per phase is either at P-bus or N-bus. This extra load point level, that is, the DC midpoint, in the three level inverter accounts for its lower load current harmonic amplitudes than a two level inverter chopping at the same frequency.

The capacitor 128 bank 130 midpoint (at DC midpoint 126) and the clamping diodes 122 connected between capacitor bank midpoint and switches S1/S2 and S3/S4 respectively keep the maximum DC working voltage across any switch from exceeding one half of the DC bus voltage (Vdc/2), provided the DC filter capacitor midpoint voltage is maintained at Vdc/2. Regulators are built into the modulator to keep the midpoint voltage at Vdc/2 to guard against long term unequal discharge of the two capacitor bank halves. The resistor network 119 (shown in FIG. 2) across the DC bus capacitor bank serves as a fixed safety bleed resistor and a balance network for initial capacitor charging.

Figure 4:
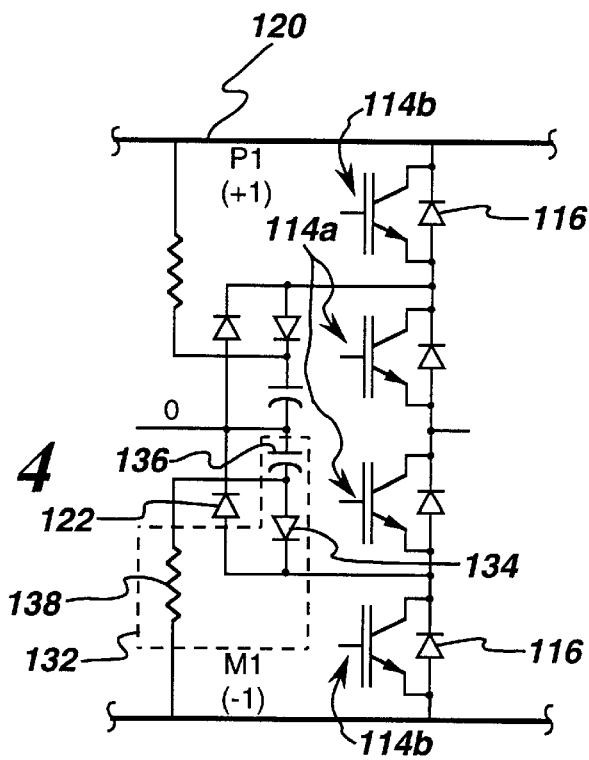
FIG. 4 is a circuit diagram of snubber circuits applied to inner switch elements of the NPC phase leg of FIG. 3.

FIG. 4 is a circuit diagram of optional snubber circuits 132 applied to inner switches 114a of the NPC phase leg of FIG. 3. A snubber diode 134 will turn on during switch turn-off whenever the voltage across the device exceeds the positive portion 120 of the bus, effectively placing the snubber capacitor 136 in parallel with switch 114a. The capacitor will transiently absorb the excess energy stored in the parasitic circuit inductances in series with the switch. After the switch is turned off, the ringup voltage across the snubber capacitor is dissipated in the snubber resistor 138. The snubber elements are sized to keep the switching trajectory of voltage and current within the a safe operating area. If IGBT switches are used, an inverter will typically be constructed with low inductance circuit paths and buswork so that at low current levels the phase leg can be safely switched. The inner switches 114a (S2 & S3) commutate current between higher inductance circuit paths as compared to outer switches 114b (S1 & S4) with current switching through four device elements rather than two device elements. Consequently, the inner switches will experience greater voltage overrings and can require snubbers.

Figure 5:
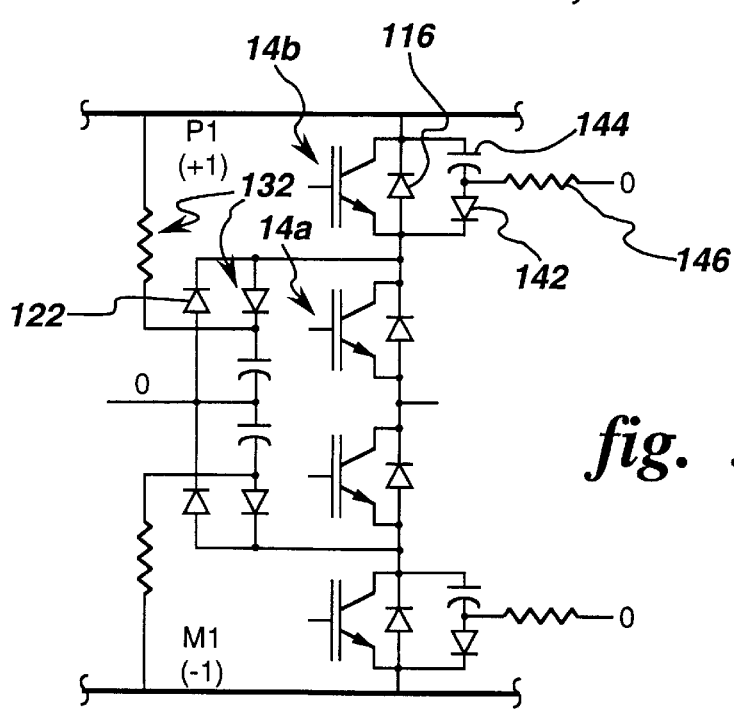
FIG. 5 is a circuit diagram of snubber circuits applied to outer switch elements of the NPC phase leg of FIG. 3.

FIG. 5 is a circuit diagram of optional snubber circuits applied to outer switches of the NPC phase leg of FIG. 4. The illustrated outer switch snubbers also act to clamp the overring across the switch to half the DC bus voltage during device turnoff. Snubber diode 142, snubber capacitor 144, and snubber resistor 146 of FIG. 4 operate on the outer switches in the same manner as snubber diode 134, snubber capacitor 136, and snubber resistor 138 of FIG. 4 operate on the inner switches.

In the circuit of FIG. 2, if one phase of the load (line-neutral) is connected across the bridge, the output voltage can have three levels in each polarity: 0, Vdc/2, and Vdc, where Vdc is the DC bus voltage. This permits a total of five unique voltage levels to be generated across the load as shown in Table 3. The phase bridge states are labeled M–Q in five levels with M being the most negative and Q most positive.

TABLE 3 five level Bridge States

| Phase-Bridge State | Phase-Leg A1 State | Phase-Leg A2 State | Phase-Bridge Voltage |
|---|---|---|---|
| M | + | − | −Vdc |
|   | + | 0 |   |
| N | 0 | − | −Vdc/2 |
|   | + | + |   |
| O | 0 | 0 | 0 |
|   | − | − |   |
| P | 0 | + | +Vdc/2 |
|   | − | 0 |   |
| Q | − | + | +Vdc |

States M and Q are unique, and, because neither the A1 nor A2 phase legs are in the 0 state, the charge balance between the upper and lower halves of the DC capacitor bank is not forced to change.

States N and P will affect the charge balance between the upper and lower half of the DC bus capacitor bank because only one of the two NPC phase legs is connected in the 0 state. Depending on which of the redundant connections are selected for state N (or P) and load current polarity, the load current will either directly charge or discharge the DC bus neutral point. By controlling the relative dwell time between these two alternative N (or P) connections the modulation algorithm can actively control the neutral voltage balance.

State O is also not unique, producing zero voltage across the bridge output by either of three alternative phase leg connections. The 00 connection connects the load current to the neutral for both phase legs yielding no net charge or discharge current into the DC neutral. The ++ and -- phase leg connections do not involve the DC neutral.

The resistor network 119 across the DC bus capacitor bank 130 serves as a fixed safety bleed resistor and a balance network for initial capacitor charging.

The non-regenerative source converter illustrated in FIG. 2 uses an eighteen pulse diode rectifier 148 to convert the AC grid power into the DC bus required for the NPC voltage source inverter. Low grid current distortion is important to avoid excessive harmonic distortion on the utility grid. The eighteen pulse series connection of three six pulse diode rectifier bridges uses a grid transformer with three sets 154 of output windings with 20 degree phase separation between the three winding sets. Although eighteen pulse diode rectifiers are preferred, other diode rectifiers can alternatively be used.

One alternative embodiment (not shown), for example, capable of achieving the requisite IEEE-519 current distortion levels is a twenty four pulse configuration including four six pulse rectifiers in series fed from a grid transformer with secondary sets of 15 degree phase separation. This embodiment has an advantage in that the split DC bus required for the NPC output converter stage can be achieved by feeding two series rectifier bridges into the upper half of the capacitor bank and the remaining two rectifier bridges into the lower half of the capacitor bank. This stiff independent power feed obviates the need for active control of neutral voltage balance. This option however results in an increase in number of diode components, an increase in transformer complexity, and an increase in cabling costs.

Another alternative embodiment (not shown) is a twelve pulse configuration including two six pulse rectifier bridges. This embodiment includes less diode components and complexity at the expense of additional distortion.

Low harmonic distortion of grid current is important for the IEEE-519 standard which requires a measurable objective of less than five percent total demand distortion at the grid connection. The IEEE 519-1992 harmonic limits are a function of the ratio of line short circuit, Isc, to drive rated current, III. For ratios below twenty, the harmonic current limits expressed in terms of Total Demand Distortion (TDD) are given in Table 2. This measure differs from total harmonic distortion since harmonic content is measured relative to drive rated current. Overall current TDD must be less than five percent.

TABLE 2

IEEE-519-1992 Harmonic Current Limit Requirements

| Harmonic (h) Range | TDD Limit |
| --- | --- |
| 1<h<13 | 4% h odd–1% h even |
| 11<h<19 | 2% h odd–0.5% h even |
| 17<h<25 | 1.5% h odd–0.375% h even |
| 23<h<35 | 0.6% h odd–0.15% h even |
| Total Demand Distortion, all harmonics | $\{[Sum(I_h^2 - I_1^2)]^5/I_{ii}\} * 100\% < 5\%$ |

In addition, due to special harmonic generation properties, of eighteen pulse rectifiers, the TDD limits for eighteen pulse rectifiers for its characteristic harmonics can be increased by a factor of 1.73 provided the amplitudes of the non-characteristic harmonics are twenty five percent of the limits specified in the tables. IEEE 519-1992 also restricts the line voltage distortion. The total harmonic distortion (THD) with a maximum line impedance of five percent should not exceed five percent with each individual harmonic not exceeding three percent THD.

Figure 6:
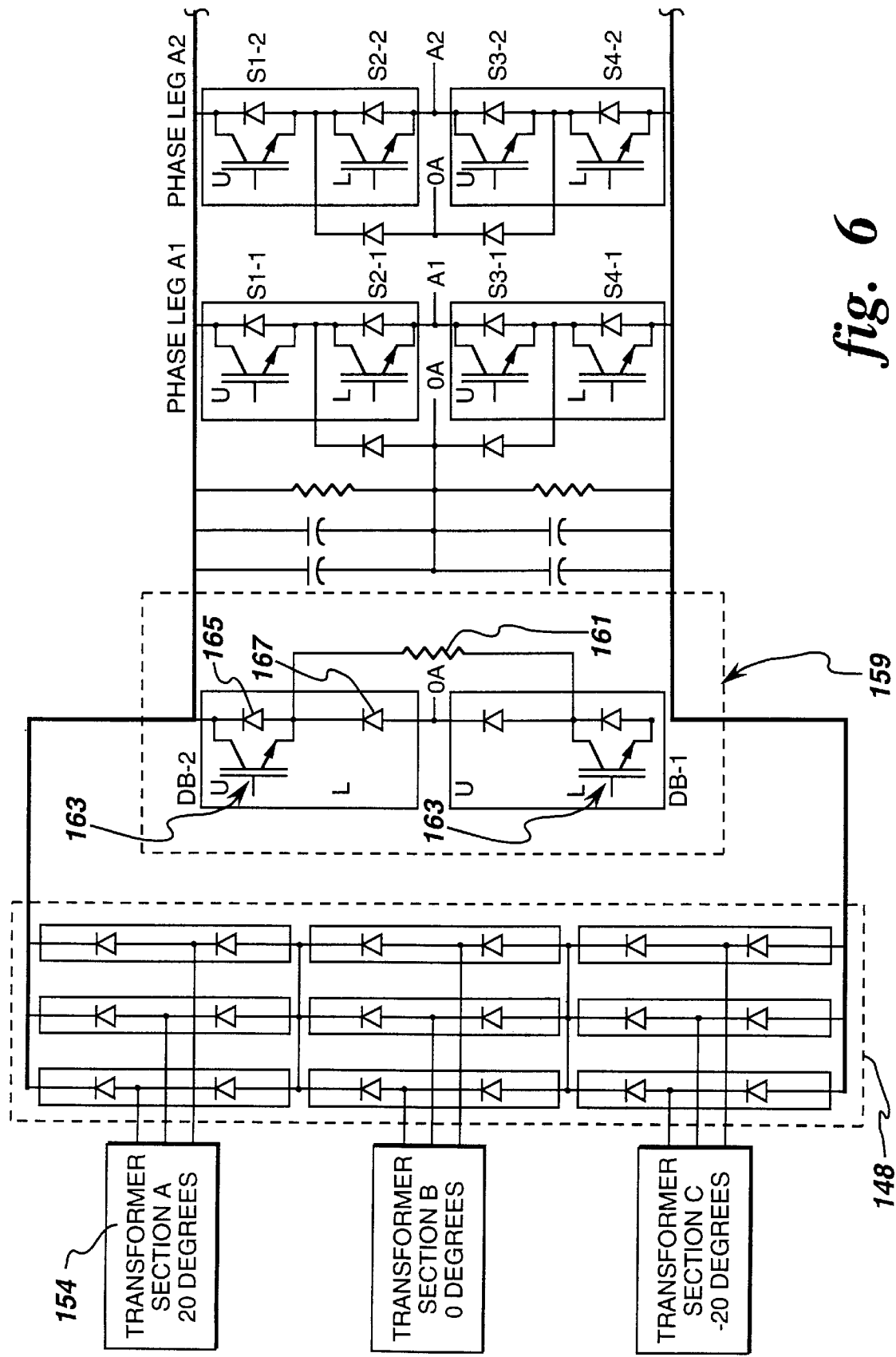
FIG. 6 is a circuit diagram of a single phase bridge of five level inverter with a dynamic braking (DB) circuit.

FIG. 6 is a circuit diagram of a single phase bridge of five level inverter with an optional dynamic braking (DB) circuit 159 applied to the non-regenerative source converter. The DB resistor 161 is supplied to transiently dissipate energy stored in the rotating inertia which is regenerated into the DC bus during motor deceleration. The DB switches 163 are gated in synchronism based on measured DC bus voltage i.e. whenever the DC bus voltage rises above the high line level. The controller should provide adequate hysteresis in order to both limit maximum bus voltage, DB switching frequency, and device switching losses. A freewheeling diode path 165 is supplied to accommodate inductive current paths to the DB resistors. A diode clamp path 167 to the DC bus neutral is supplied to allow for timing variances in the two DB switches.

Figure 7:
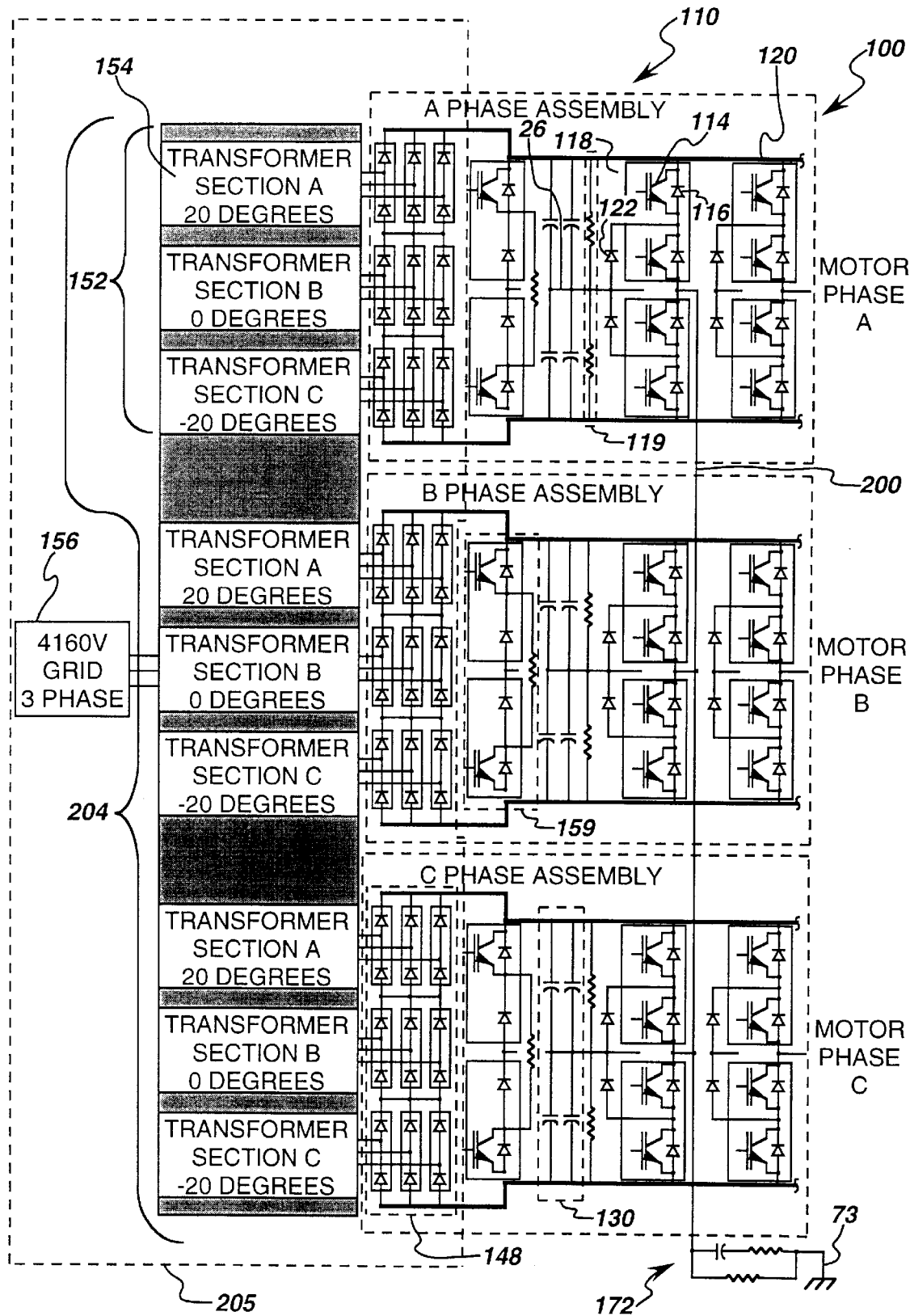
FIG. 7 is a circuit diagram of a low total harmonic distortion (THD) five level inverter circuit with isolated DC busses.

FIG. 7 is a circuit diagram of a low total harmonic distortion (THD) five level inverter circuit 110 with isolated DC busses 120. The non-regenerative circuit of FIG. 7 provides good grid current quality (IEEE 519-1992 compliance) for 4160 V I—I without series stacking of switches. This embodiment has reduced complexity as compared to currently proposed embodiments.

The converter of FIG. 7 includes three identical NPC phase bridge sections 100 connected in wye through a converter neutral connection 200 (not motor neutral) to generate the required output voltage. Each section is supplied by an isolated eighteen pulse rectifier 148 providing DC bus voltage to the phase bridge. Each DC bus voltage is filtered and split in half by a capacitor bank 130. The three DC busses should be isolated from each other and from ground. By such connection of the phase bridges, the peak voltage achievable between two converter output terminals is equal to 2 Vdc, rather than Vdc as in standard converter topologies.

The power converter of FIG. 7 offers considerable practical advantages as compared to the conventional five level embodiment of aforementioned Baker et al., U.S. Pat. No. 4,270,163, as shown in FIG. 1. This circuit uses the same number (24) of primary switch and diode pairs but six fewer clamp diodes (twelve vs. eighteen). To achieve a 4160 V output the Baker et al. embodiment would require a 6000 V DC bus whereas the present invention requires only a 3000 V DC bus, a difference which has a significant impact on practical construction of low impedance buswork. At present, for the aforementioned Baker et al. embodiment, the requisite fast diodes with high voltage blocking capability 4500 V are not commercially available, and the clamp diode requirements significantly exceed those of the primary switch and free wheeling diode. The parasitic inductance in Baker et al. of the long chain of four switches in series will significantly increase the likelihood of requiring snubbers and the amount of captured energy the snubbers would absorb. Also the present embodiment has a simpler capacitor voltage balancing structure: two series connected capacitors are balanced together at one time as compared to the four series connected capacitors of Baker et al. which would require balancing. The present invention does include, however, in FIG. 7 an increased number and size of the DC link capacitors because of the isolated DC busses.

The DC capacitor banks in the embodiment of FIG. 7 are subjected to single phase loading conditions, unlike more conventional common DC bus converter topologies. There will be a significant current at twice the fundamental output/load frequency resulting in significant DC bus voltage ripple al twice this frequency. The converter will consequently require more per unit (pu) DC bus capacitance to minimize this voltage ripple. Each of the three DC busses will have ripple voltages phase-displaced according to the 120 degree load phase displacement.

The entire converter can be supplied by a single transformer 204 with three sets 152 of identical nine phase secondary windings. The transformer 204 receives power from an AC (alternating current) power grid 156. The transformer will supply the required isolation between each set of secondary windings and consequently the individual phase bridges. The eighteen pulse harmonic cancellation should occur within this multi-winding rectifier transformer 205. This embodiment is effective as long as continuity of current is achieved in the transformer secondaries. The transformer secondary impedance is used to force this condition. Current can become discontinuous at light loads, depending on transformer impedance and net DC bus capacitance levels. Optionally, every phase bridge section can contain a dynamic braking circuit 159. Three isolated dynamic braking resistors are used for this option.

Optionally, a grounding reference network 172 is coupled between the DC neutral point 26 and a ground frame 73. The ground reference network impedance is chosen to approximately match motor cable characteristic impedance. The network should be capable of continuous operation with a grounded motor phase. The voltage across the ground reference network is monitored by the controller for ground fault detection.

A DSP-based drive controller can achieve active neutral control by gate timing manipulation in order to maintain equal voltage balance on the split series capacitor banks (between the upper and lower halves; of the three DC links). It is desirable to also have tight control of the neutral charging currents in order to minimize the capacitance values required.

The controller of the converter system preferably includes a digital signal processor including software, interface circuits for voltage and current feedback data acquisition, and digital timers for switch activations based on DSP computed timings.

The DSP includes vector control of both machine torque and flux. The DSP also includes modulation control for the hybrid NPC converter bridge. Additionally, the DSP includes active DC bus neutral voltage control by gate timing manipulation in order to maintain equal voltage balance on the split series capacitor banks.

Figure 8:
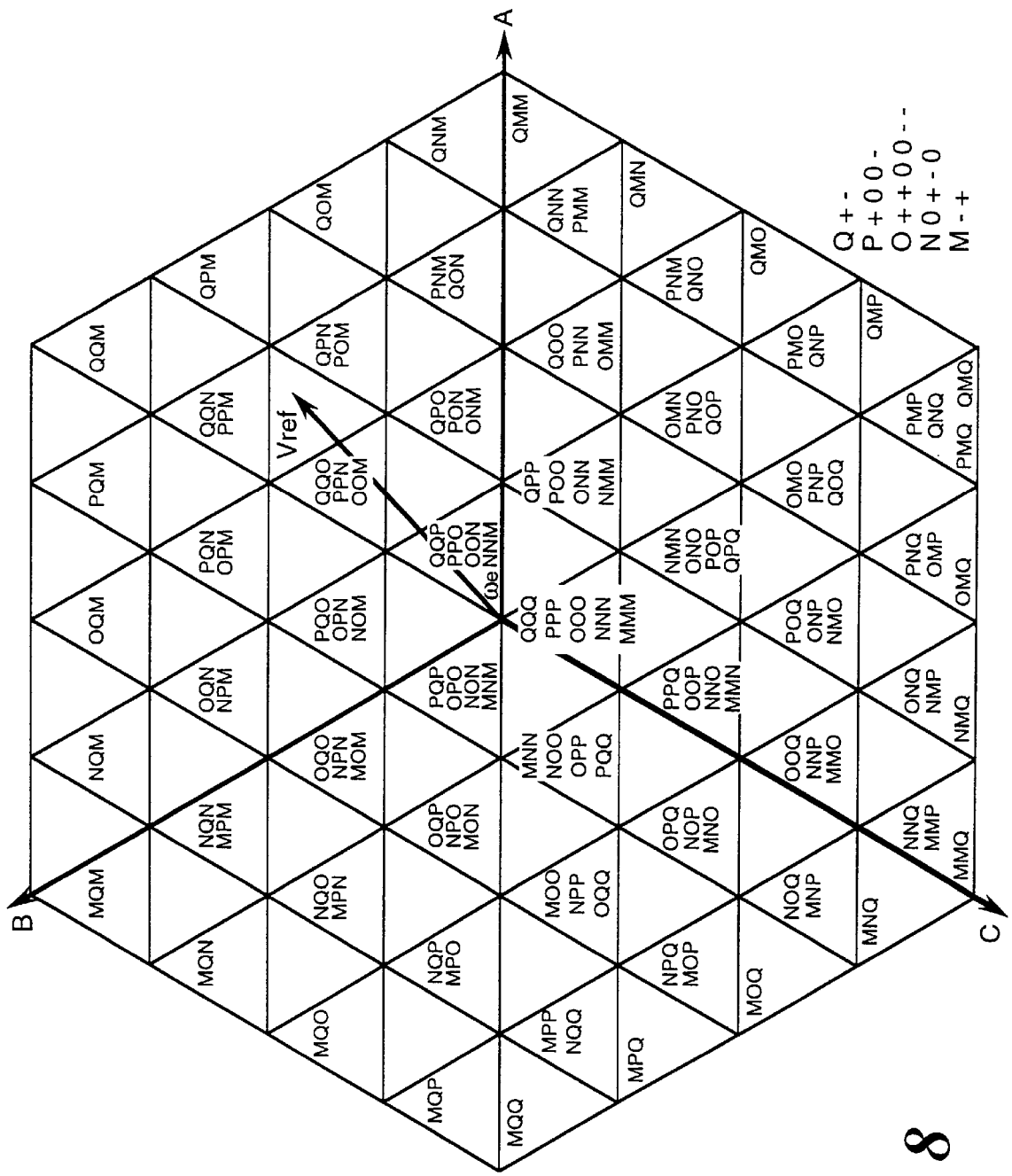
FIG. 8 is a diagram of five level modulation control.

FIG. 8 is a diagram of five level pulse width modulated (PWM) space vectors illustrating the vector space that the five level inverter control system can achieve. The hexagonal boundaries are established by the DC bus magnitude. FIG. 8 is idealized in that the regular hexagon shapes illustrated assume equal DC bus voltages on the three isolated DC busses and DC bus ripple voltages are ignored. The triangular subdivisions of the vector space are established by vertices representing the 125 possible combinations of the phase bridge switching states. Many states are redundant i.e. equivalent line-line voltage forcing. The origin has five redundant states (QQQ, PPP, OOO, NNN, and MMM) while each hexagonal boundary outwards from the origin has successively one less redundant state with the outer boundaries uniquely defined as illustrated in FIG. 8

A reference voltage vector Vref is denoted rotating at frequency $w_e$ in a counter clockwise direction. For smooth voltage synthesis during steady state conditions the reference voltage vector will sweep through adjoining triangular regions at a sinusoidal frequency and a substantially constant magnitude. Space vector synthesis will create the desired voltage by time modulating between the three corner vertices of the triangular region containing the reference voltage vector tip. The modulator control should traverse the individual vertices with calculated dwell times to create the correct average voltage vector each switching period.

Figure 9:
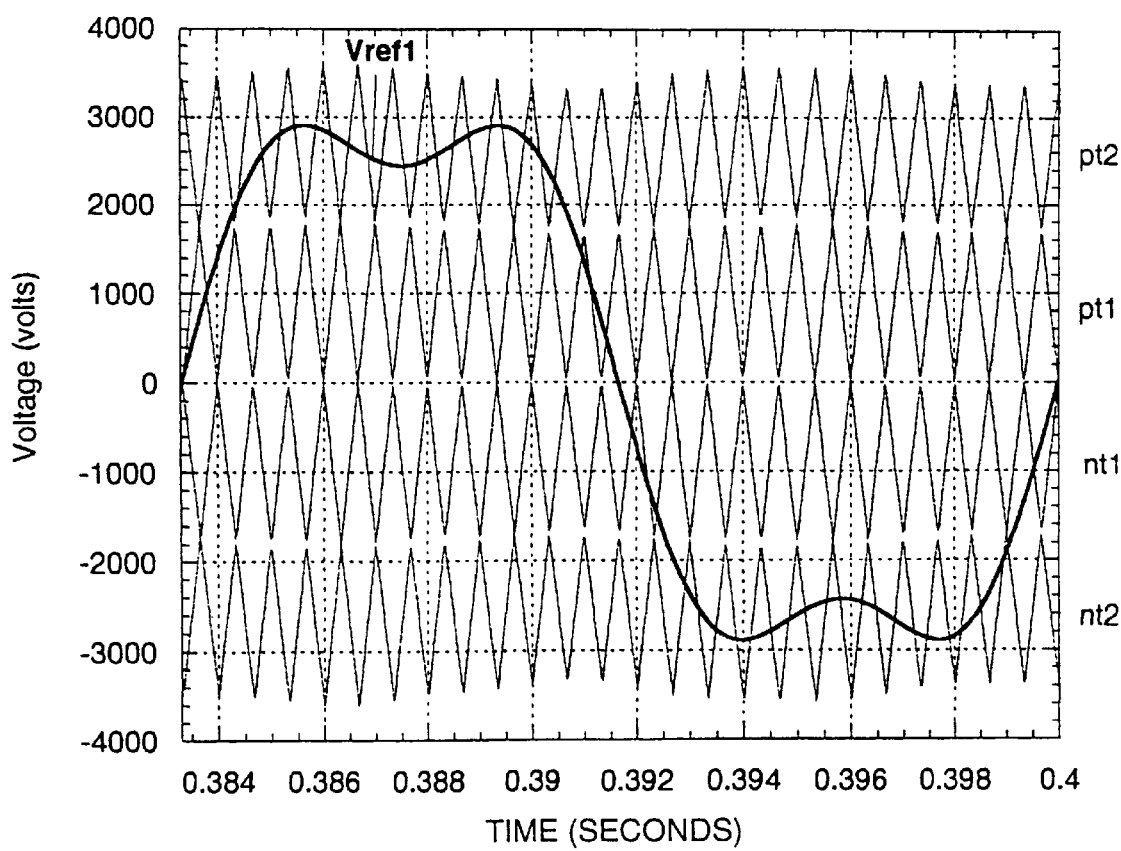
FIG. 9 is a graph of sine-triangle modulation control with DC bus feedforward and third Harmonic Injection.

FIG. 9 is a graph of sine-triangle modulation control with DC bus feedforward and third Harmonic Injection. In the present invention an enhanced sine-triangle modulation algorithm is implemented in software. In FIG. 9, triangular carrier waveforms are represented by pt1, pt2, nt1, and nt2, and the reference voltage vector is represented by vref1. Each time that vref1 crosses one of the triangular carrier waveforms, a switch of the inverter has changed its state.

Third harmonic injection is described in Kerkman et al., "Simple Analytical and Graphical Tools for Carrier Based PWM Methods", IEEE 1997, pp. 1462–1471. In the present embodiment, twenty five percent third harmonic injection added to the desired reference sine waveform of FIG. 9 will extend the linear operating region of the converter approximately twelve percent before the onset of overmodulation. The addition of third harmonic distortion will affect the phase to converter neutral voltage but when applied equivalently to all three converter phase bridges will cancel out of the line-line voltages, thereby leaving the motor currents unaffected.

The triangular waveforms are amplitude modulated by the DC bus ripple pattern on the specific phase being gated. A unique set of carrier waves are generated for each converter phase bridge. This feedforward action will correctly compensate the gate timings for the amplitude variations of the respective DC busses.

Figure 10:
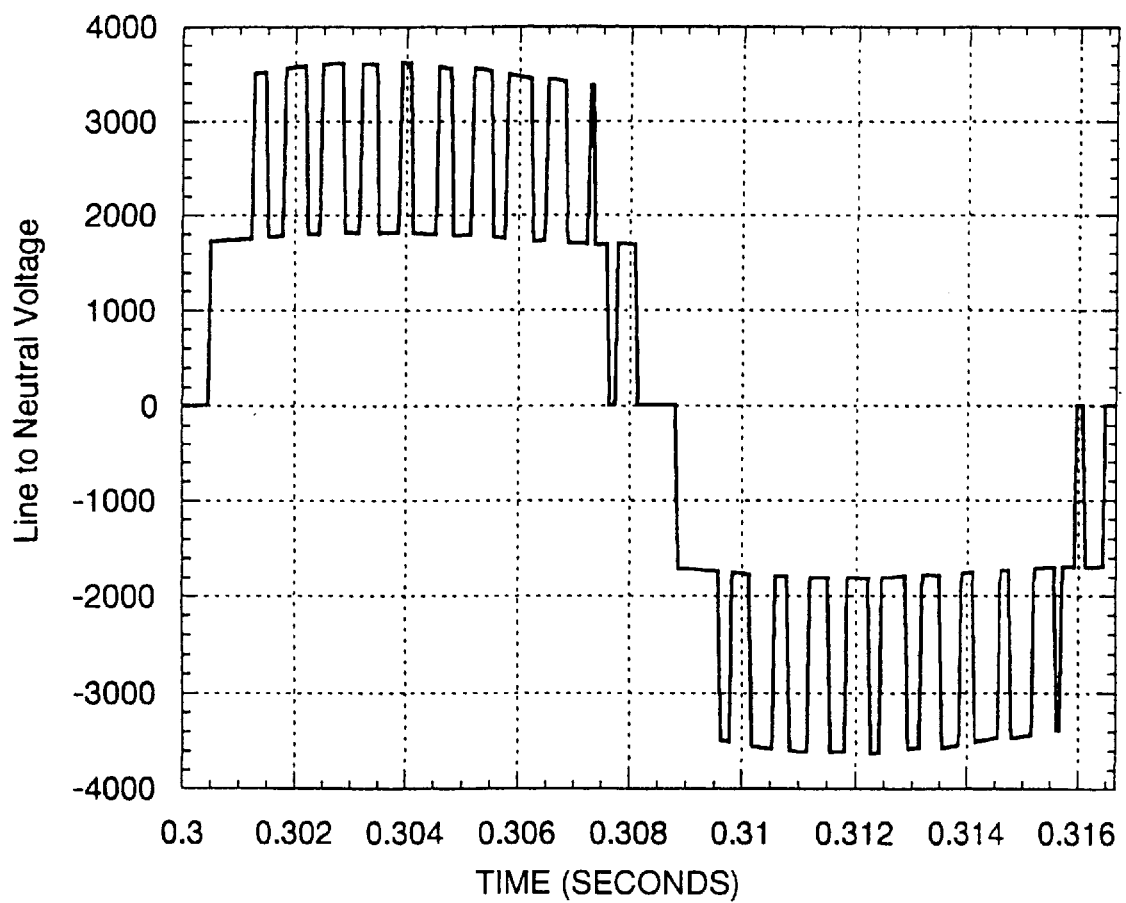
FIG. 10 is a graph of a line-neutral voltage switching pattern.
Figure 11:
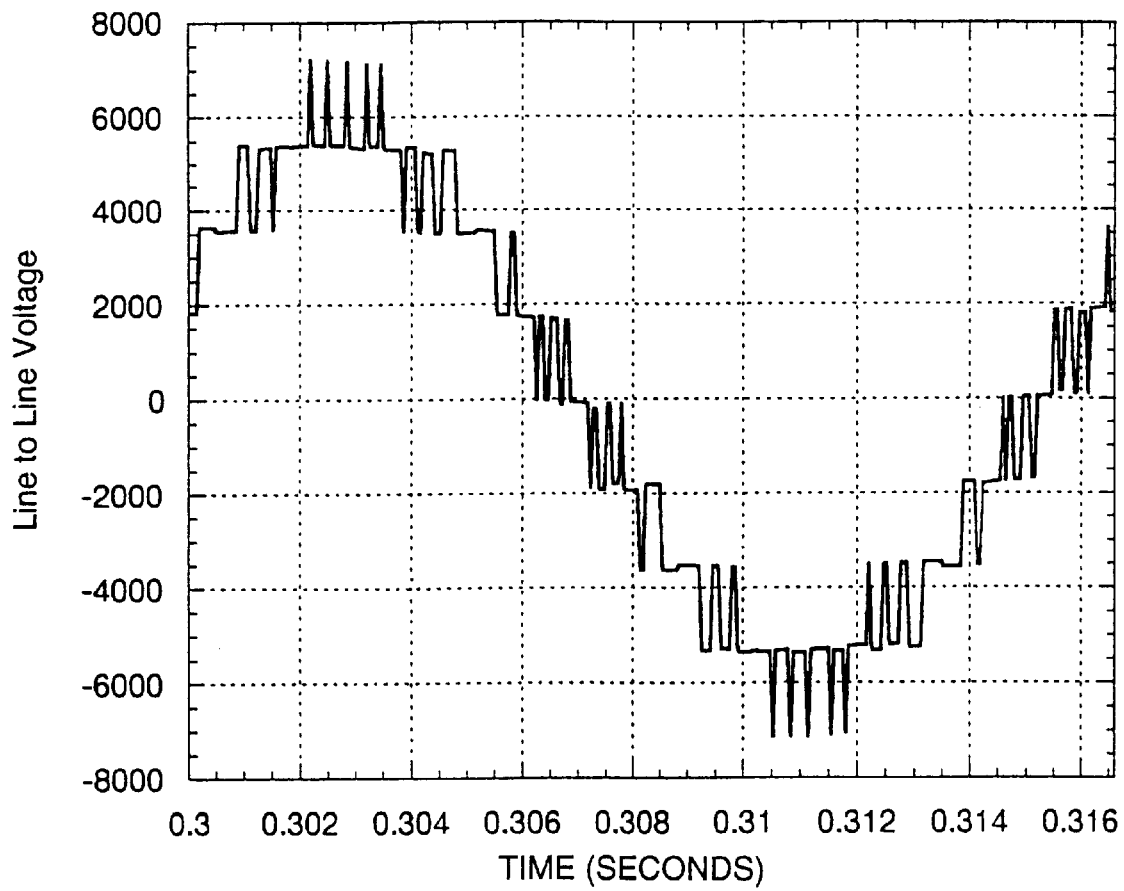
FIG. 11 is a graph of a line-line voltage switching pattern.

FIGS. 10 and 11 are graphs illustrating the line-converter neutral voltage switching pattern (five levels) and the resultant line-line voltage switching pattern (nine levels) produced by the modulation control. The amplitude modulation of the line-neutral voltage pattern is caused by the single phase DC bus ripple. The fine switching resolution produced by the five level converter bridge is evident in the line-line voltage waveform presented to the motor.

Figure 12:
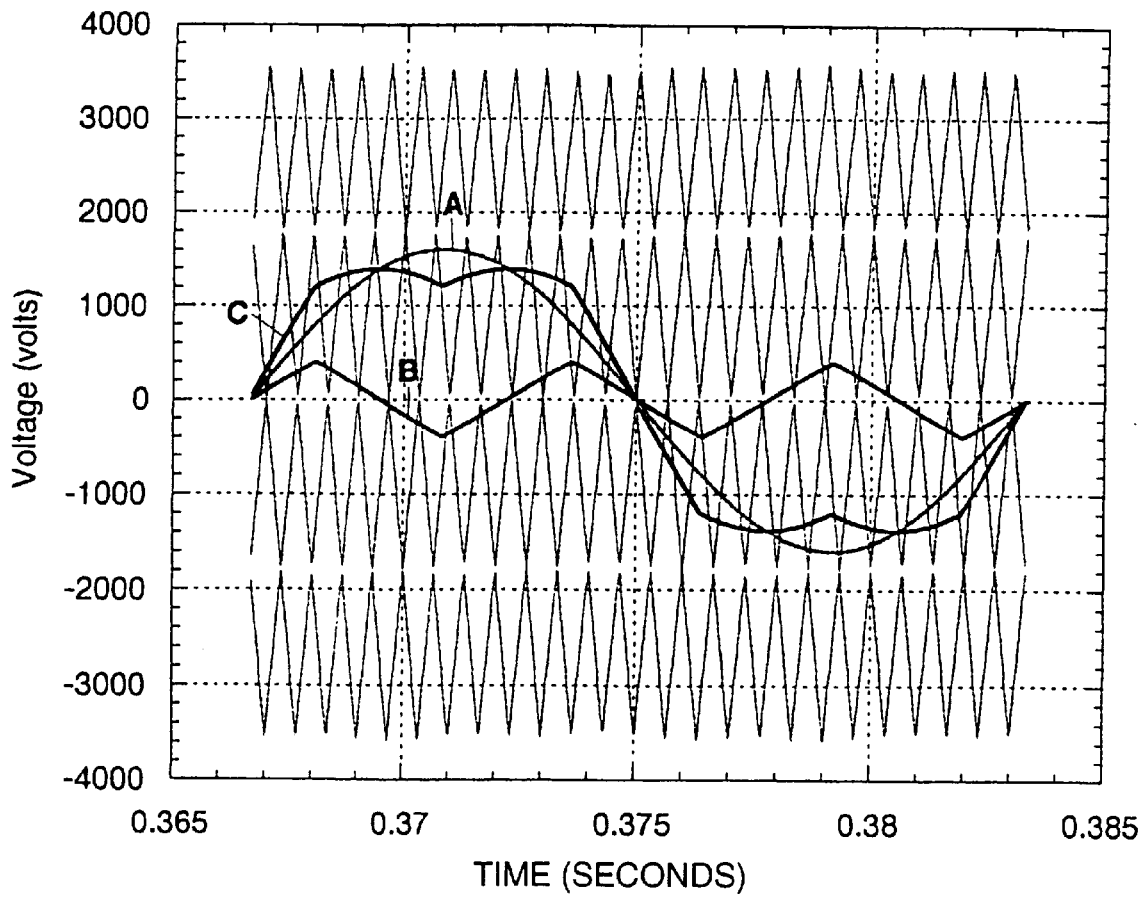
FIG. 12 is a graph illustrating 'space vector' equivalent harmonic injection.

FIG. 12 is a graph illustrating a preferred 'space vector' equivalent triplen harmonic injection which will achieve the maximum theoretical extension of the linear converter operating regime by approximately fifteen percent. In FIG. 12, waveform A represents the voltage to be supplied to the motor; waveform B represents the injected triplen harmonic (third harmonic and multiples of the third harmonic); and waveform C represents the reference voltage vector with each intersection between the reference voltage vector and a triangular carrier waveform indicating a changed state of a switch of the inverter. Techniques for harmonic injection are described, for example, in aforementioned Kerkman et al. and in Van Der Broeck et al., "Analysis and Realization of a Pulsewidth Modulator Based on Voltage Space Vectors", IEEE IAS Transactions, Vol. 24, No. 1, January/February 1988.

Figure 13:
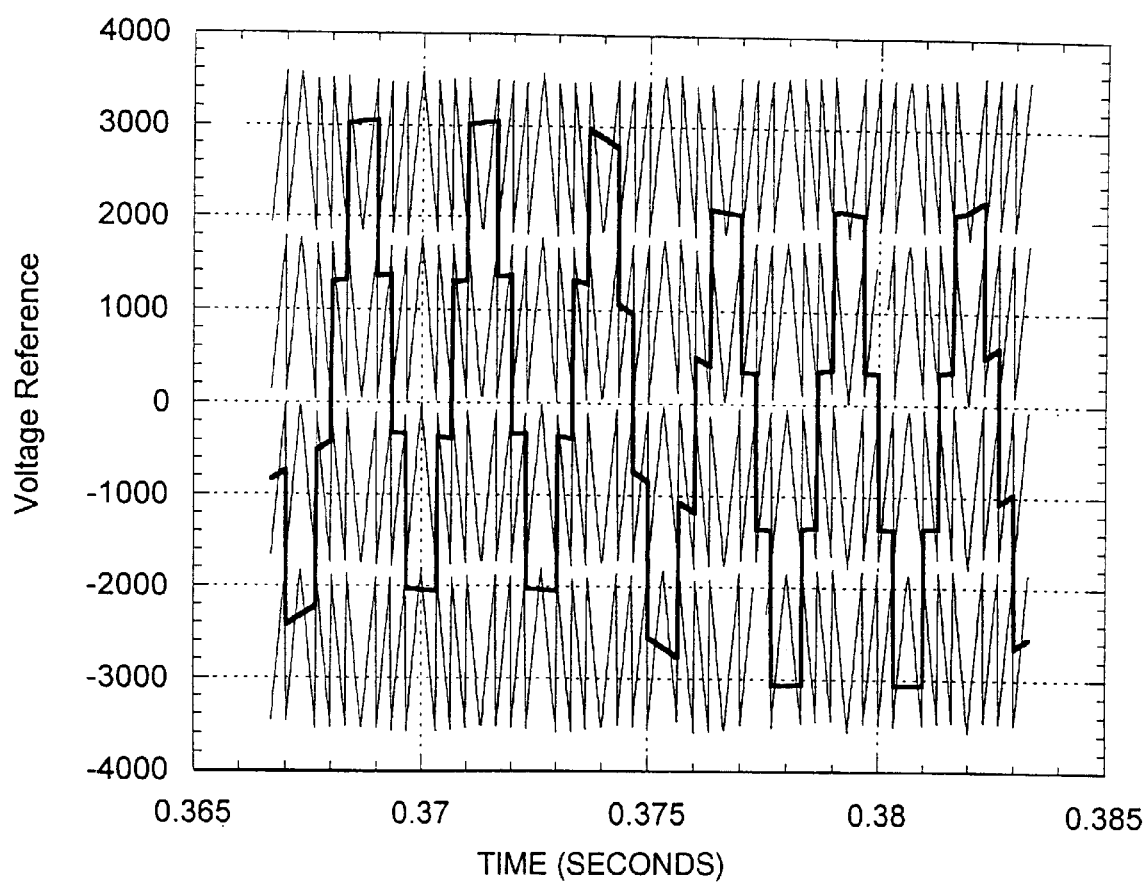
FIG. 13 is a graph of a zero-sequence injection pattern for Vref<½ Vdc.
Figure 14:
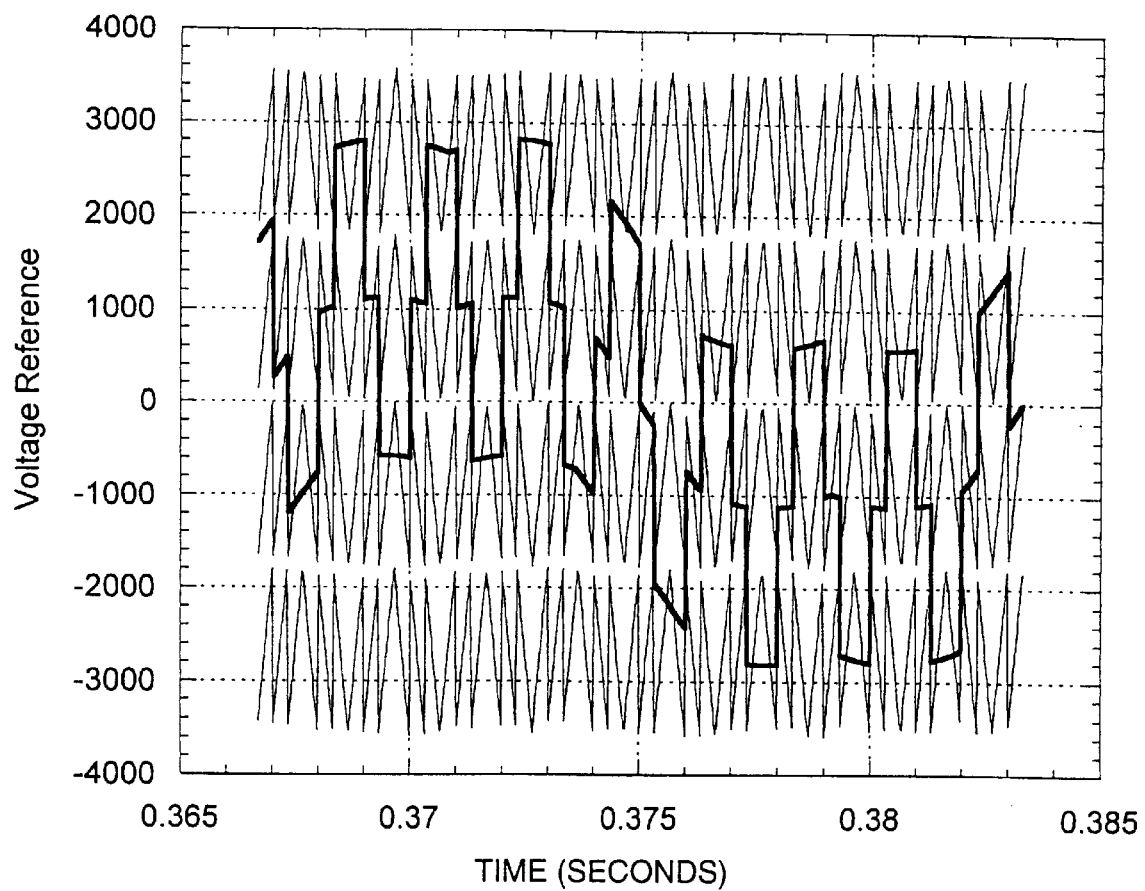
FIG. 14 is a graph of a zero-sequence injection pattern for ½ Vdc<Vref<Vdc.
Figure 15:
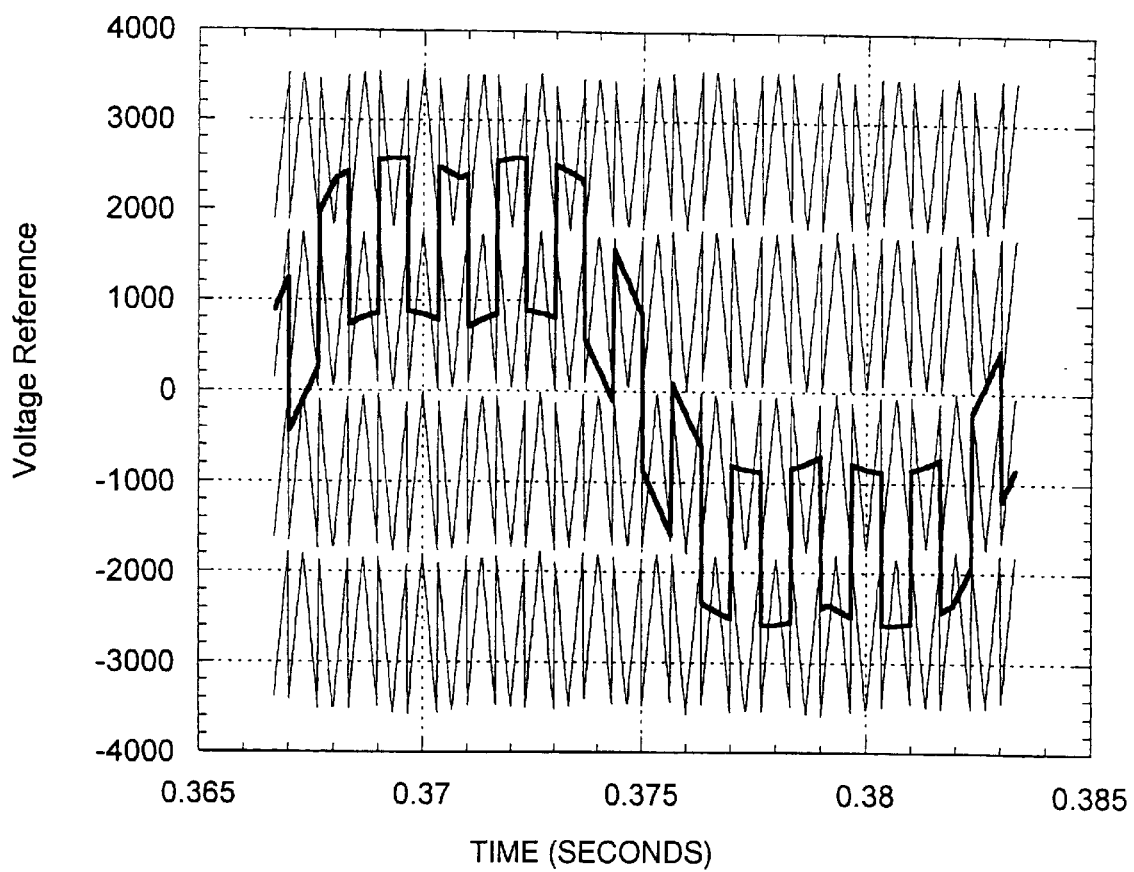
FIG. 15 is a graph of a zero-sequence injection pattern for Vdc<Vref<3/2 Vdc.

FIGS. 13–15 are graphs illustrating zero sequence injection patterns for different magnitude ranges of the reference voltage vector. In a preferred embodiment, the zero sequence injection is performed in addition to the triplen or third harmonic injection of FIG. 12 or FIG. 9, respectively. The zero sequence injection can alternatively be performed without triplen or third harmonic injection.

FIG. 13 is a graph of a zero-sequence injection pattern for Vref <½ Vdc. This graph illustrates the addition of the zero sequence shift pattern to the reference waveform. A zero-sequence or DC addition will alter the phase bridge voltage, but when applied to all three phase bridges equivalently will riot appear in the line-line voltage waveforms and hence will not affect motor currents. The zero sequence pattern for low amplitude peak to peak references less than Vdc/2 (i.e. spanning only one triangle carrier wave) is applied as −¾ Vdc, −¼ Vdc, +¼ Vdc, and +¾ Vdc. Because Vdc is not constant, the average of the three DC bus voltages is used. The zero sequence pattern switches every carrier half period to the next sequential 'DC shift' in the order listed, traversing from −¾ Vdc to +¾ Vdc, reaching the maximum positive 'DC shift', then reversing backwards through the sequence. The zero sequence addition serves to force switching first up (towards the positive DC rail) and then down (towards the negative DC rail) in a given phase bridge which is equivalent to traversing the vertices of the inner triangle of FIG. 8 spiraling up the phase bridge states to QQQ and then back down to MMM. This zero sequence injection distributes switching and conduction losses amongst all the bridge elements. The zero sequence shift pattern also serves to center a small amplitude reference sine wave in the middle of each carrier wave thereby maximizing gating pulse widths. This technique will avoid the narrow pulse widths and consequent waveform distortion that has challenged past developments.

FIG. 14 is a graph of a zero-sequence injection pattern for ½ Vdc<Vref<Vdc illustrating the zero sequence injection pattern: −½ Vdc, 0, +½ Vdc for peak to peak reference amplitudes between Vdc/2 and Vdc (i.e. spanning two carrier triangle waves). As the amplitude of the reference sinusoid grows, the zero sequence injection pattern shifts.

FIG. 15 is a graph of a zero-sequence injection pattern for Vdc<Vref<³⁄₂ Vdc and illustrates the zero sequence injection pattern: −¼ Vdc, +¼ Vdc for peak to peak reference amplitudes between Vdc and ³⁄₂ Vdc (i.e. spanning three carrier triangle waves).

For peak to peak reference amplitudes between ³⁄₂ Vdc and 2 Vdc (i.e. spanning all four carrier triangle waves), no zero sequence injection is used thereby preventing premature overmodulation or pulse dropping.

Figure 16:
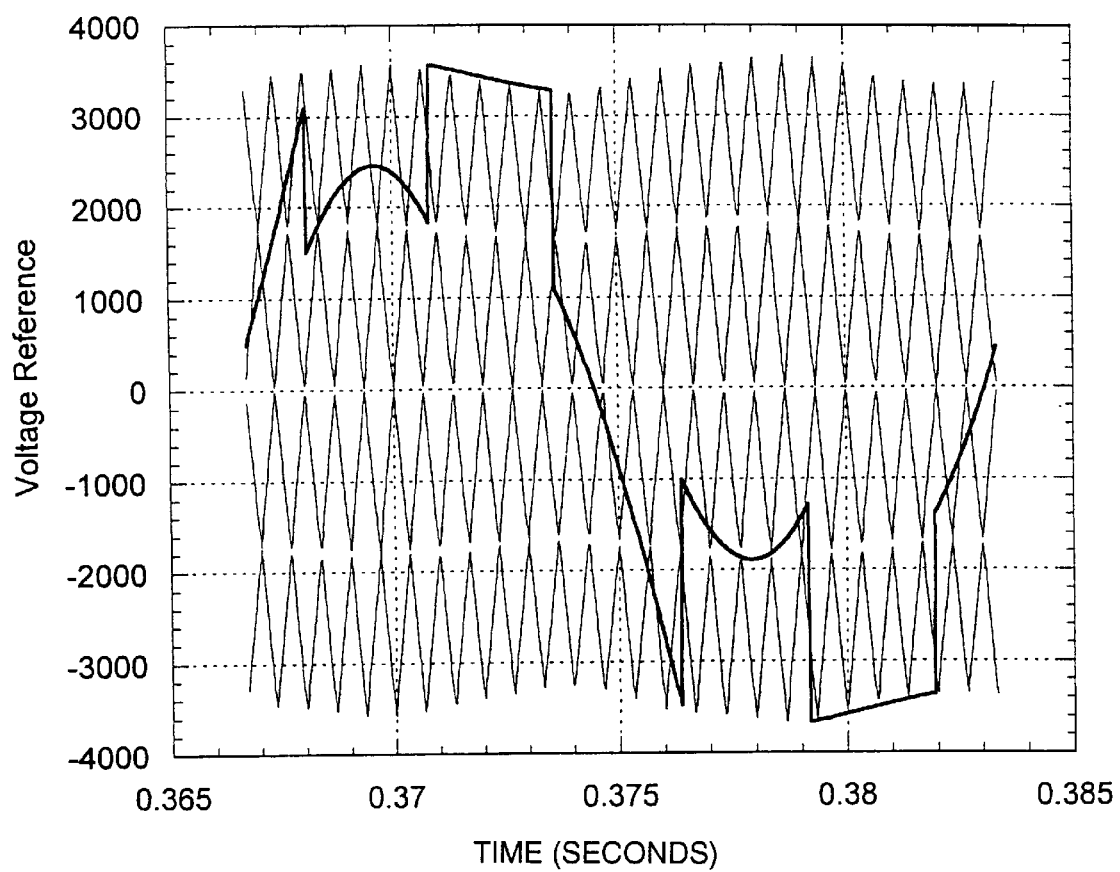
FIG. 16 is a graph of a discontinuous modulation injection pattern.

FIG. 16 is a graph of a discontinuous modulation injection pattern applied for large amplitude reference waves such as waves near full rated converter output voltage. In one embodiment, the discontinuous modulation injection pattern is used by itself without the above discussed injection patterns.

In another embodiment, the discontinuous modulation injection pattern is used in conjunction with the above discussed injection patterns. In this embodiment, the above discussed injection patterns are used until the reference voltage vector is present in one of a number of predetermined operating regions. When the reference voltage vector is present in such a region, the discontinuous modulation injection pattern is then used.

In FIG. 16, a discontinuous segment is added for a 60 degree period to force overmodulation on a given phase. This effectively clamps one phase at a time to either its positive or negative DC rail leaving the pulse width modulation wave formation to the other two phases. A discussion of such clamping can be found, for example, in Kolar et al., "Influence of the Modulation Method on the Conduction and Switching Losses of a PWM Converter System", IEEE Transactions on Industry Applications, November/December 1991, pp. 1063–1075. Due to the constrained non-orthogonal nature of the three phase power system, the two phases actively gating can still achieve full linear sinusoidal control of the output line-line voltages. The 60 degree discontinuous segments are centered 30 degrees after the reference voltage vector peak, a peak which corresponds to the peak currents for an induction motor load with typical power factor of 0.83.

The injected levels should track the actual DC bus voltage of the 'overmodulated' phase in order to properly compensate the gating pulse widths of the two active phases. The injected pattern thus commutates around as a feedforward signal for the rippling DC busses. This discontinuous injection pattern yields two results: first, the average phase bridge switching frequency is reduced by ⅓ factor i.e. for a 1.5 KHz carrier wave the average phase bridge switching frequency is only 1 KHz, and second, a given phase bridge never switches the peak output currents, thereby substantially reducing its total switching losses. The net effect is a substantial increase in converter efficiency at high output voltages which will correspond to full load for pump/fan type loads. This increased converter efficiency is obtained without any decrease in torque control bandwidth but with some small increase in motor current harmonic amplitude.

The modulation control should also control the charge balance of the three isolated split DC busses. As shown in Table 3 above, phase bridge gating states N and P provide an opportunity to influence voltage balance with the two available alternatives having an equal and opposite effect on neutral charge balance. For example, for Iload>0 the P state (0−) will discharge the midpoint while the alternate P state (+0) will have an equal and opposite charging effect. For balanced operating conditions the modulator should balance the relative dwell times of the two alternative P states and also the two alternative N states. Except for gate timing inaccuracies the other phase bridge gating states of M, O, and Q do not affect the state of neutral charge.

This invention adopts a bang-bang control strategy for control of each DC bus neutral. Every gating instant when the modulator commands the P state (or N state) for a given phase bridge, the controller will use the polarity of DC bus midpoint voltage error along with the feedforward load current polarity to choose amongst the two gating state alternatives. The controller directs the entire required dwell time one way or the other, depending on whether the DC midpoint requires charging or discharging at that control instant. Effectively this choice involves a change in state of either the left NPC phase leg or the right NPC phase leg and connects the selected phase leg to the neutral for the computed dwell time. The modulation strategy adopted by this invention only changes one of the two NPC phase legs per phase-bridge state transition. Unlike a conventional NPC five level converter bridge, the neutral point control in this invention is independent of the three phase modulation selections. The effect of the bang-bang control strategy is to force tight regulation on a pulse-by-pulse basis of the neutral about the desired Vdc/2.

Figure 17:
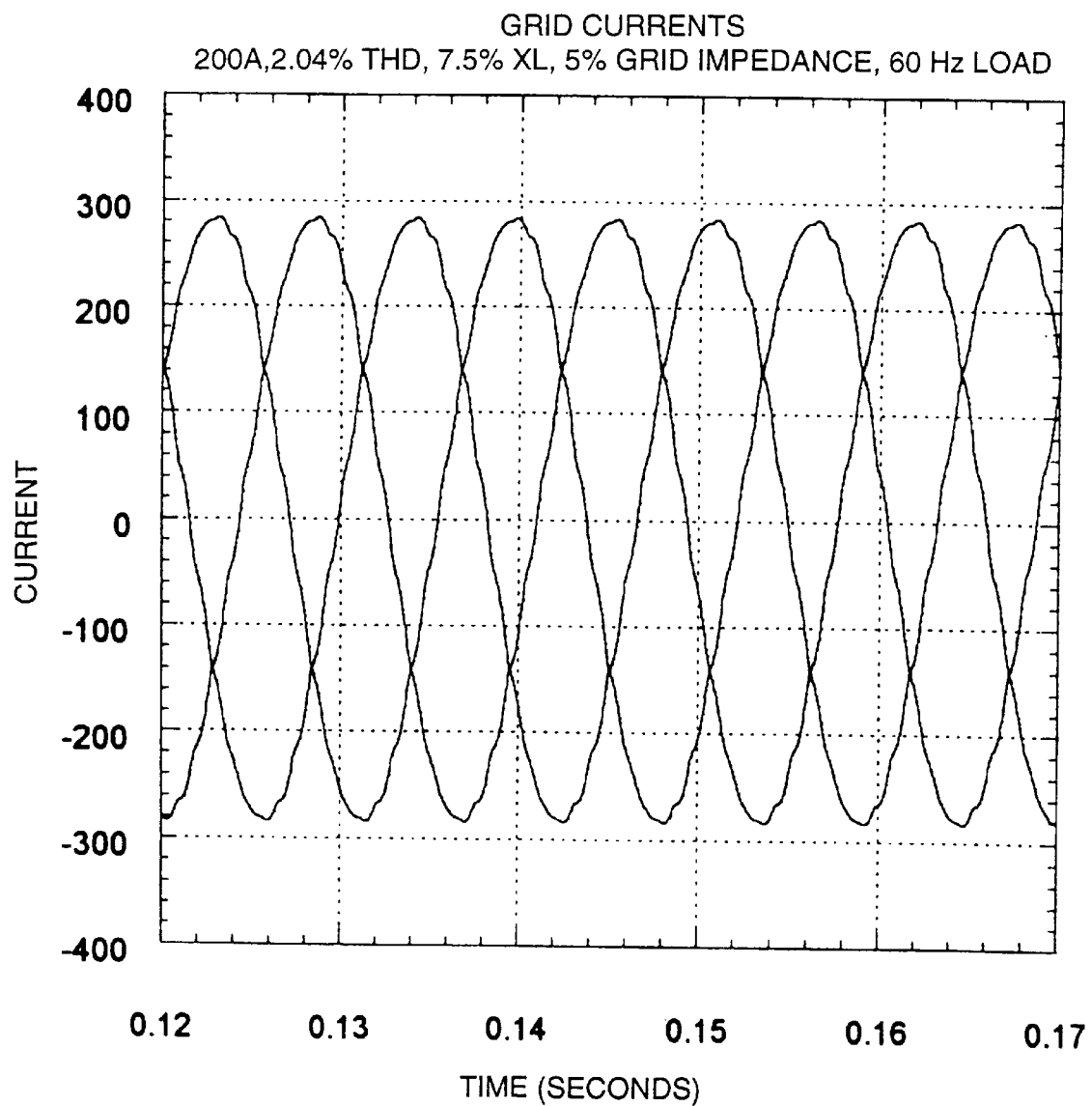
FIG. 17 is a graph of a simulated grid current.
Figure 18:
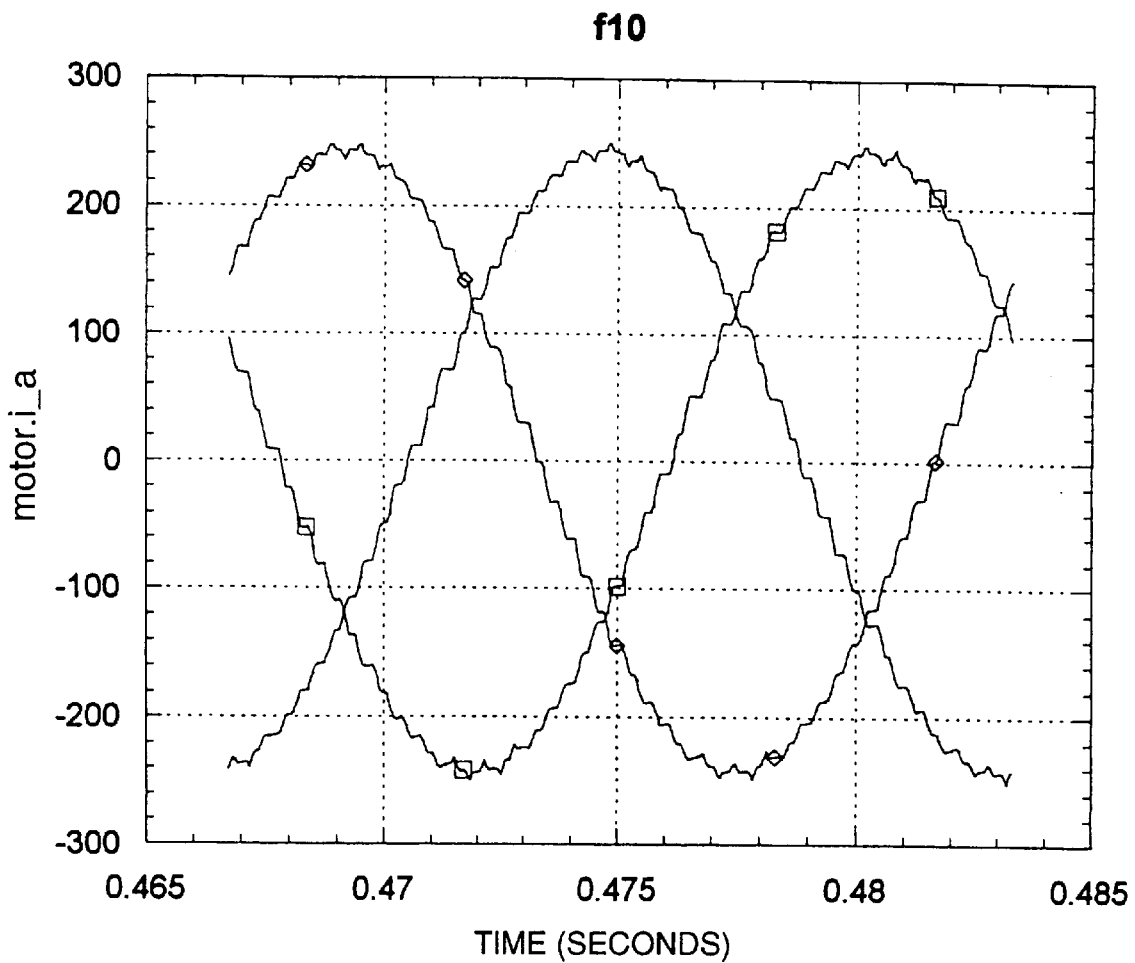
FIG. 18 is a graph of a simulated load current.

FIGS. 17 and 18 are graphs of simulated grid and load currents. The simulations were performed to test the feasibility of the present invention for use in AC drive applications. FIGS. 17 and 18 show simulated source and load current waveforms with approximately two percent THD obtained in the simulated three phase grid current at full load.

While only certain preferred features of the invention have been illustrated and described herein, many modifications and changes will occur to those skilled in the art. It is, therefore, to be understood that the appended claims are intended to cover all such modifications and changes as fall within the true spirit of the invention.

We claim:

1. A high power motor drive converter comprising:

three direct current busses;

a five level hybrid neutral point clamped (NPC) output power conversion stage comprising three NPC phase bridges including switches and coupled in a wye configuration through a neutral point, the NPC output power conversion stage for supplying power to an AC drive motor, each NPC phase bridge receiving power on a respective one of the three direct current busses;

three isolated split series-connected DC capacitor banks each coupled in parallel to a respective one of the three NPC phase bridges;

a controller for selecting switch positions with active control of neutral voltages;

a rectifier transformer with three sets of three phase secondaries, each set coupled in parallel to a respective one of the capacitor banks; and three diode rectifier source converter bridges each coupled in parallel to a respective one of the three sets of three phase secondaries.

2. The converter of claim 1 further including snubber circuits each coupled to a respective switch.

3. The converter of claim 1 further including a neutral-ground reference network tuned to provide damping for reflected wavefronts propagating on the motor cables.

4. The converter of claim 1 further including three resistor networks, each resistor network coupled in parallel with a respective one of the capacitor banks for balancing capacitors of the capacitor banks and enhancing capacitor safety during capacitor charging.

5. The converter of claim 1 wherein the controller is adapted to use space vector modulation to control a magnitude and a rotation of a reference voltage vector in a complex voltage plane.

6. The converter of claim 1 wherein the controller is adapted to select switch positions using feedforward sine-triangle modulation with third harmonic injection applied to each of the three NPC phase bridges.

7. The converter of claim 6 wherein the controller is further adapted to select switch positions using discontinuous modulation injection.

8. The converter of claim 1 wherein the controller is adapted to select switch positions to apply a space vector equivalent triplen harmonic waveform injection to each of the three NPC phase bridges.

9. The converter of claim 8 wherein the controller is further adapted to select switch positions using feedforward sine-triangle modulation with discontinuous modulation injection.

10. The converter of claim 8 wherein the controller is further adapted to select switch positions using feedforward sine-triangle modulation with zero sequence injection applied to each of the three NPC phase bridges.

11. The converter of claim 1 wherein the controller is adapted to select switch positions using feedforward sine-triangle modulation with zero sequence injection applied to each of the three NPC phase bridges.

12. The converter of claim 11 wherein the controller is adapted such that, if a peak magnitude of a reference voltage vector is less than one half (½) of a direct current bus voltage (Vdc), the zero sequence injection is applied sequentially at voltages of $-\frac{3}{4}$ Vdc, $-\frac{1}{4}$ Vdc, $+\frac{1}{4}$ Vdc, $+\frac{3}{4}$ Vdc, $+\frac{3}{4}$ Vdc, $+\frac{1}{4}$ Vdc, $-\frac{1}{4}$ Vdc, and $-\frac{3}{4}$ Vdc.

13. The converter of claim 11 wherein the controller is adapted such that, if a peak magnitude of a reference voltage vector is in the range of about ½ Vdc to about Vdc, the zero sequence injection is applied sequentially at voltages of $-\frac{1}{2}$ Vdc, 0, $+\frac{1}{2}$ Vdc, $+\frac{1}{2}$ Vdc, 0, and $-\frac{1}{2}$ Vdc.

14. The converter of claim 11 wherein the controller is adapted such that, if a peak magnitude of a reference voltage vector is in the range of about Vdc to about 1.5 Vdc, the zero sequence injection is applied sequentially at voltages of $-\frac{1}{4}$ Vdc and $+\frac{1}{4}$ Vdc.

15. The converter of claim 1 wherein the controller is adapted to select switch positions using feedforward sine-triangle modulation with discontinuous modulation injection.

16. The converter of claim 15 wherein the discontinuous modulation injection comprises the addition of a discontinuous segment for a sixty degree period for forcing overmodulation on a selected one of the three phases to clamp the selected one of the three phases to either a positive or negative direct current bus value, the discontinuous segment being situated about 30 degrees after a reference voltage vector peak.

17. A method of controlling a high power motor drive converter including three direct current busses, a five level hybrid neutral point clamped (NPC) output power conversion stage comprising three NPC phase bridges including switches and coupled in a wye configuration through a neutral point, each NPC phase bridge receiving power on a respective one of the three direct current busses, and three isolated split series-connected DC capacitor banks each coupled in parallel to a respective one of the three NPC phase bridges, the method comprising:

selecting switch positions with active control of neutral voltages by using space vector modulation to control a magnitude and a rotation of a reference voltage vector in a complex voltage plane.

18. A method of controlling a high power motor drive converter including three direct current busses, a five level hybrid neutral point clamped (NPC) output power conversion stage comprising three NPC phase bridges including switches and coupled in a wye configuration through a neutral point, each NPC phase bridge receiving power on a respective one of the three direct current busses, and three isolated split series-connected DC capacitor banks each coupled in parallel to a respective one of the three NPC phase bridges, the method comprising:

selecting switch positions with active control of neutral voltages by using feedforward sine-triangle modulation with third harmonic injection applied to each of the three NPC phase bridges.

19. The method of claim 18 wherein selecting switch positions further includes using discontinuous modulation injection.

20. A method of controlling a high power motor drive converter including three direct current busses, a five level hybrid neutral point clamped (NPC) output power conversion stage comprising three NPC phase bridges including switches and coupled in a wye configuration through a neutral point, each NPC phase bridge receiving power on a respective one of the three direct current busses, and three isolated split series-connected DC capacitor banks each coupled in parallel to a respective one of the three NPC phase bridges, the method comprising:

selecting switch positions that apply a space vector equivalent triplen harmonic waveform injection to each of the three NPC phase bridges to provide active control of neutral voltages.

21. The method of claim 20 wherein selecting switch positions further includes using discontinuous modulation injection.

22. The method of claim 20 wherein selecting switch positions further includes applying zero sequence injection to each of the three NPC phase bridges.

23. A method of controlling a high power motor drive converter including three direct current busses, a five level hybrid neutral point clamped (NPC) output poser conversion stage comprising three NPC phase bridges including switches and coupled in a wye configuration through a neutral point, each NPC phase bridge receiving power on a respective one of the three direct current busses, and three isolated split series-connected DC capacitor banks each coupled in parallel to a respective one of the three NPC phase bridges, the method comprising:

selecting switch positions with active control of neutral voltages by using feedforward sine-triangle modulatin with zero sequence injection applied to each of the three NPC phase bridges.

24. A method of controlling a high power motor drive converter including three direct current busses, a five level hybrid neutral point clamped (NPC) output power conversion stage comprising three NPC phase bridges including switches and coupled in a wye configuration thourgh a neutral point, each NPC phase bridge receiving power on a respective one of the three direct current busses, and three isolated split series-connected DC capacitor banks each coupled in parallel to a respective one of the three NPC phase bridges, the method comprising:

selecting switch positions with active control of neutral voltages by using feedforward sine-triangle modulation with discontinuous modulation injection.

25. The method of claim 24 wherein the discontinuous modulation injection comprises the addition of a discontinuous segment for a sixty degree period for forcing overmodulation on a selected one of the three phases to clamp the selected one of the three phases to either a positive or negative direct current bus value, the discontinuous segment being situated about 30 degrees after a reference voltage vector peak.

* * * * *